United States Patent [19]
Gardner et al.

[11] 3,740,468
[45] June 19, 1973

[54] FEATURE PARAMETER MEASUREMENT BY LINE SCANNING

[75] Inventors: Gerald Marvin Gardner, Saffron Walden; David William Gibbard, Melbourn, near Royston, both of England

[73] Assignee: Image Analysing Computers Limited, Royston, England

[22] Filed: Mar. 28, 1972

[21] Appl. No.: 238,893

[30] Foreign Application Priority Data
Apr. 17, 1971 Great Britain ..................... 9,738/71
Sept. 21, 1971 Great Britain .................. 43,912/71

[52] U.S. Cl. ............................................. 178/6.8
[51] Int. Cl. ............................................ H04n 3/00
[58] Field of Search ............... 178/6.8, 6; 356/102; 235/92 PC

[56] References Cited
UNITED STATES PATENTS
2,494,441 1/1950 Hillier ........................... 235/92 PC
3,244,810 4/1966 Williams ............................. 178/6.8
3,619,494 11/1971 Fisher ..................................... 178/6
3,621,129 11/1971 Fisher ................................. 178/6.8

Primary Examiner—Raulfe B. Zache
Attorney—Norman F. Oblon, Stanley P. Fisher, Marvin J. Spivak et al.

[57] ABSTRACT

Methods and apparatus are described by which various dimensional measurements of features can be made using electrical pulses obtained from a video signal itself obtained by scanning the field or an image thereof.

Methods and apparatus specifically described relate to vertically and horizontally projected length measurements and perimeter measurement.

Measurements may be made simultaneously on all features in a field and total values obtained for the field without knowledge of the individual length measurements. Alternative methods and apparatus are described by which individual measurements are possible on each detected feature.

Methods of combining measured values so as to produce shape factor information are also described.

24 Claims, 8 Drawing Figures

FEATURE PARAMETER MEASUREMENT BY LINE SCANNING

BACKGROUND OF THE INVENTION

1. Field of the Invention

This invention concerns the analysis of features in a field for which a video signal is obtained by lines scanning and particularly methods and apparatus for obtaining signals equivalent to the vertically and horizontally projected length and perimeter of detected feature content in the field.

2. Description of the Prior Art

By horizontally projected length is meant the length of the feature when viewed end on from one side and by vertically projected length is meant the length of the feature when viewed end on from above or below. These two measurements are indicated diagrammatically in FIG. 1 of the drawings.

It will be appreciated that a measure of the shape of a feature is possible by comparing the one projected length with the other. Thus the ratio of horizontally to vertically projected length for a circle will be unity. For a long thin feature lying parallel to the horizontal direction, the ratio of horizontally to vertically projected length will be very much greater than unity and for a thin feature lying perpendicular to the horizontal this ratio will be much less than unity. Thus, provided the orientation of the features is known, long thin features can readily be distinguished from generally circular features by determining the ratio of the horizontally to vertically projected length for each feature and comparing this with unity.

This facility is of distinct advantage in the analysis of non-metallic inclusions in steel when it is necessary to distinguish between Silicate inclusions and inclusions of Alumina and/or Oxides.

As is known from U.S. Pat. No. 2,494,441 a signal indicative of the total horizontally projected length of all detected features in a field can be obtained by scanning the field in a series of parallel lines to obtain a video signal and counting the number of transits of the scanning beam across the features during a single field scan. Where there is only one feature in the field the length dimension signal will indicate the horizontally projected length dimension of that feature.

In order that the features may be distinguished from their background they must be either lighter or darker than the background, or a different colour or grey level. The amplitude of the video signal produced by scanning a field containing distinguishable features will thus contain sudden variations in level between one level corresponding to the background and a different level or levels corresponding to the features. Selection is achieved by comparing the amplitude variations in the video signal with a reference voltage (as described in British Patent Specification No. 1,127,742 Metals Research Limited). An electrical signal can be generated following the comparison by generating a pulse for the duration of each video signal amplitude excursion which satisfies the comparison criterion (e.g. exceeds the reference voltage). This signal (commonly referred to as detected video signal) will thus comprise a series of pulses of equal height but whose duration in each case corresponds to the length of a line scan intersection with a feature whose colour or grey level satisfies the detection criterion.

SUMMARY OF THE INVENTION

According to the present invention a method of generating a signal indicative of the vertically projected length of detected feature content in a field comprises the steps of delaying the detected video signal pulses by one line scan period, comparing the delayed pulses with those from the next line scan, generating a difference pulse of duration equal to the duration of any detected pulse or part thereof from the said next line scan which is not coincident with a delayed pulse and accumulating the difference pulses which occur during the scan of the field to produce an output signal.

Conveniently the detected video signal pulses or difference pulses are electronically chopped at a constant frequency to provide trains of pulses in place of continuous pulses, the number of chopped pulses in each series being proportional to the duration of the original detected signal pulse. Accumulation can then be performed by counting the chopped pulses.

Where the detected video signal pulses relate to one feature only then the vertically projected length signal relates to that one feature.

If both horizontally and vertically projected length signals are required simultaneously e.g. for comparison or division of one by the other then the two summations are either carried out simultaneously or one performed during a first scan of the field and the length signal stored while a second scan is performed during which the second summation is performed.

The ratio of horizontally to vertically projected length can be determined by dividing the appropriate signals. Comparison with a reference value will determine whether the shape factor is acceptable or otherwise and the result of such comparison can be employed to control the release of information obtained during the scan.

If a separate signal representing one or the other projected length is required for each individual feature, it is necessary to associate with each feature the detected video signal pulses arising from scanning that feature and make available the accumulated length signal for that feature at a unique instant in the scan. This can be achieved by employing an associated parameter computer and anti-coincidence detector as described in British Patent Specifications Nos. 1,264,804 and 1,264,805 in the one case counting the line scan transitions for each feature and in the other case programming the computer modules A, B, C to perform the method steps according to the method of the present invention for the detected video signal pulses associated with each feature.

If both horizontally and vertically projected lengths are required for each feature simultaneously e.g. for comparison then two appropriate associated parameter computers are required, synchronised and gated by a common anti-coincidence detector also as described in British Patent Specification No. 1,264,805 and in co-pending British Patent application No. 53403/69 the one computing horizontally and the other, vertically projected length signals for each feature.

According to a preferred feature of the present invention a method of generating a signal equivalent in magnitude to the perimeter of detected feature content in a field comprises the steps of generating a first series of difference pulses indicative of the vertical projection of the feature content in accordance with the present invention, comparing the leading edges of detected signal pulses from the current line scan and those from the previous line scan (delayed by one line scan period) and generating a count pulse whenever the two leading edges coincide, comparing the trailing edges of detected signal pulses from the current line scan and those from the previous line scan delayed by one line scan period, and generating a count pulse whenever the two trailing edges coincide, comparing the delayed detected signal pulses with those on the next line scan and generating a difference pulse of duration equal to the duration of any delayed pulse or part thereof which is not coincident with a detected pulse on the said next line scan, thereby to generate a second series of difference pulses and integrating the first and second series of difference pulses and said count pulses during a field scan to produce a final signal whose magnitude is indicative of the perimeter of detected feature content in the field.

Preferably the pulses forming said first and second series of difference pulses are replaced by a number of count pulses proportional to the duration of the difference pulse. This replacement can be effected either by electronically chopping the detected signal pulses or the difference pulses. In either event the integration can be performed by simply counting all the count pulses during the field scan.

Where only one feature lies in the field the integral will relate to the length of its perimeter. Where more than one feature is detected, the signals arising from the method according to the preferred feature of the invention are related to the feature from which they arise by an associated parameter computer such as described in British Patent Specifications Nos. 1,264,804 and 1,264,805.

The accuracy of the measured value of the perimeter will depend upon the spacing between the line scans and the resolution of the measurement effected in the line scan direction. The former can usually be ignored but the latter will depend upon the frequency at which the pulses are gated to produce count pulse trains instead of the difference pulses. An error will occur whenever the duration of a detected video signal pulse is not exactly equal to a whole number multiple of the gating signal period. This is rarely the case and according to a further preferred feature of the present invention a further comparison of detected signal pulses from adjacent line scans, separated by one line scan period, is made and an incremental count pulse is added to the count pulse total whenever the leading edge of a detected video signal pulse on one line occurs within one gating signal period of the leading edge of a coincident detected video signal pulse on an adjacent line and likewise whenever the trailing edges of any two such pulses occur within one gating signal period. Where a single value increment count pulse is employed a preferred value is 0.3.

A convenient device for adding 0.3 for each such count pulse comprises a separate counter for the incremental count pulses which records three for each count pulse received and which includes a limit device which generates a count pulse for the general perimeter counter whenever the incremental count pulse counter has reached 10 and which simultaneously resets this latter counter to zero.

BRIEF DESCRIPTION OF THE DRAWINGS

The invention will now be described by way of example with reference to the accompany drawings in which.

DETAILED DESCRIPTION OF THE PREFERRED EMBODIMENTS

Figure 1:
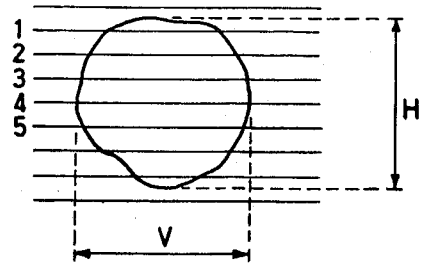
FIG. 1 illustrates a single feature intersected by a number of scan lines of a coarse raster on which the horizontally and vertically projected lengths are denoted by H and V respectively.

As previously mentioned, FIG. 1 illustrates the horizontally and vertically projected lengths of a feature intersected by a number of scan lines of a coarse raster. Certain of the scan lines are numbered 1, 2, 3 etc. and the horizontally and vertically projected lengths are denoted by H and V respectively.

Figure 2:
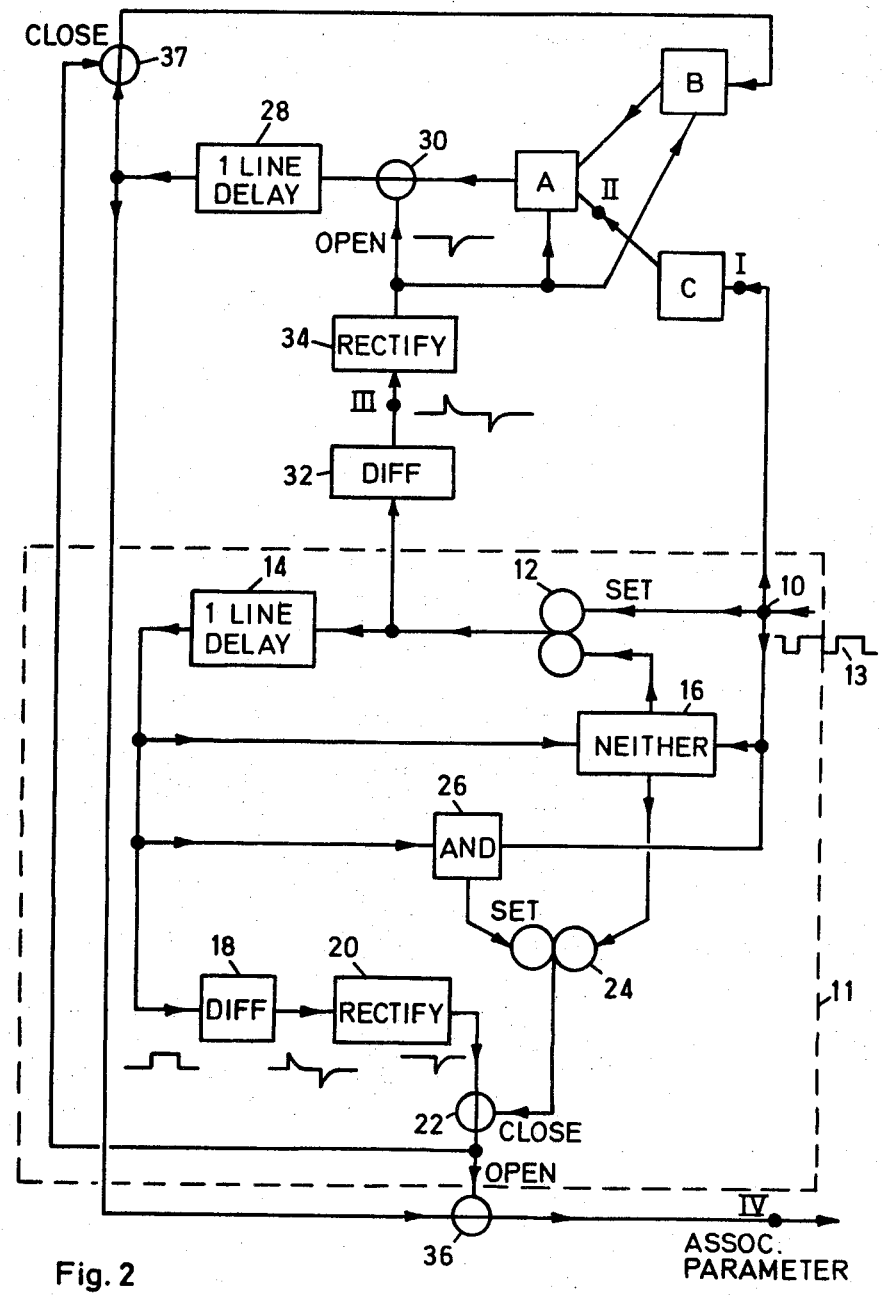
FIG. 2 is a block circuit diagram of an associated parameter and anti-coincidence circuit similar to that of FIG. 1 of British Patent Specification No. 1,264,805.

FIG. 2 of the drawings corresponds to FIG. 1 of British Patent Specifications Nos. 1,264,804 and 1,264,805. The circuit comprises a "coincidence circuit" denoted by the dotted outline 11 and an "associated parameter computer" which comprises the remainder of the circuit. The circuit is supplied with detected video signal pulses obtained from a conventional video signal by comparing (in known manner) the video signal amplitude excursions with a reference voltage and generating a pulse only when the video signal amplitude exceeds the reference voltage. Since the instantaneous amplitude values of the video signal will correspond to the greyness of points in the field, electrical pulses whose duration correspond to the length of the line scan intersections with features whose grey level differs from that of the background, can be obtained by setting the reference voltage between the voltage equivalent to the background grey level and that of the feature grey level.

Detected video signal pulses 13 are applied to junction 10 in FIG. 2 and the leading edge of a detected video signal pulse serves as a set signal for a bistable device 12. The operation of the circuit is as described in the two British Patent Specifications Nos. 1,264,804 and 1,264,805.

Assuming that a feature grey level is substantially constant and that the reference voltage has been correctly set, the duration of each detected signal pulse will correspond to the length of the intersection of the feature by each line scan. Each detected signal pulse can therefore be thought of as representing the line scan intersect with the feature and these are sometimes referred to as intersect pulses.

As more particularly described in British Patent Specification No. 1,264,805 the associated parameter computer comprises a computer module C which produces an electrical increment of information during or at the end of each detected signal pulse, a second computer module B which receives and holds an accumulation of increments from previous line scans delayed from the previous line scan by a one line scan period delay device 28 and a third computer module A which receives the signal from computer modules B and C and computes a fresh value to include the information increment from the current line scan. The new computed value is held in the computer module A and is released to the delay device 28 when a gate 30 is opened by a gating signal obtained by differentiating the trailing edge of each output pulse from the bistable device 12. In this way the gate 30 is opened at the end of each pulse. The same gating signal can be employed to cause computer modules B and A respectively to release and update the information previously supplied to them.

A further gate 37 (not described in the two Patent Specifications Nos. 1,264,804 and 1,264,805) is closed by the same pulse which opens gate 36 to prevent the final information signal, which appears as the associated parameter signal for the feature, from being recirculated once it has been released. In this way information is only circulated around the one line delay device 28 and computer modules B and A for as long as is necessary to complete scanning of a feature.

Figure 3:
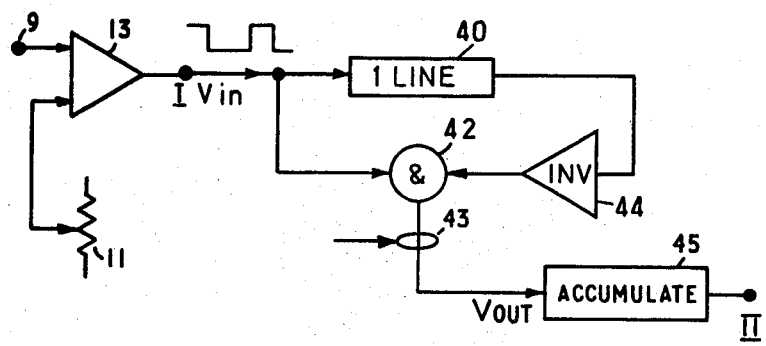
FIG. 3 is a block circuit diagram of a circuit for deriving difference pulses which when summed produce a signal whose magnitude is equivalent to the vertically projected length of detected feature content in the field.

FIG. 3 of the drawings illustrates a circuit for obtaining difference signal pulses which when summed produce a signal whose magnitude is proportional to the vertically projected detected feature content in a field. Video signal obtained by scanning the field is applied to terminal 9 for comparison with a reference voltage from potentiometer 11 in a comparator 13, this latter serving as a detector and providing detected signal pulses at I. The detected pulses are supplied to one input of an AND gate 42 and to a one line delay device 40. The delayed pulses from the latter are applied via an inverting amplifier 44 to the other input of the AND gate 42. The output of the AND gate is accumulated (e.g. integrated) in accumulator 45.

The output pulses from AND gate 42 may be electronically chopped by gating pulses applied to a gate 43, in which event accumulator 45 can comprise a pulse counter.

Figure 4:
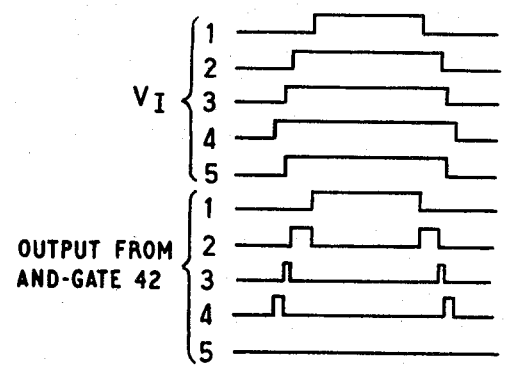
FIG. 4 illustrates the wave forms of signals at the input I and output of the AND-gate of FIG. 3 during the line scans 1 to 5 of FIG. 1.

FIG. 4 of the drawings illustrates in the top half the detected signal pulses which appear at junction 10 (terminal I of computer module C) during the five line scans numbered 1 to 5 in FIG. 1 and in the lower half the output pulses from AND gate 42.

Where the field contains more than one feature the total vertically projected length signal will relate to all the features in the field and will only be available after the field has been scanned.

Where a separate signal is required for each projected length measurement for each feature, as associated parameter computer as described in British Patent Specification No. 1,264,805 is required in which the module C is adapted to derive the appropriate increments of information from each detected video signal pulse.

The circuit of FIG. 3 may comprise the computer module C for the circuit of FIG. 2 and its input and output terminals have been marked I and II accordingly. In this event the accumulator 45 is reset at the end of each modified detected video signal pulse. Where the pulses from AND-gate 42 are not chopped it will be seen that by adding the pulses which are obtained on lines 1, 2, 3 and 4 a pulse whose total duration is proportional to the vertical projection V of FIG. 1, will be obtained. This addition is performed in the computer module A (of FIG. 2).

Where the detected signal pulses are chopped at a high frequency by gate 43 the addition may be performed by counting the number of chopped pulses which occur on each line scan in the output of the computer module C. In this way digital information is circulated in the delay device 28 which can therefore be a shift register. Preferably the register has sufficient capacity to enable a parallel word of digital information to be transmitted so as to allow for close proximity of features. The parallel word is then available at the correct instant in time at the output of the line delay device 28 for transmission as a digital associated parameter through the gate 36 when this latter is opened.

It will be appreciated that size or other form of discrimination can be applied to the information released for each feature in a field of view, to allow a size or other distribution to be obtained.

Figure 5:
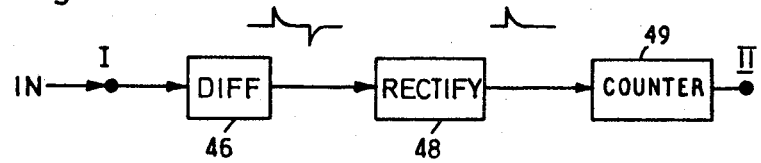
FIG. 5 is a block circuit diagram of a circuit for deriving pulses from which a length signal relating to the horizontal projected length of detected feature content can be computed by summation.

FIG. 5 illustrates a circuit for computing the horizontally projected length of detected feature content. A single count pulse is generated for each intersect pulse with the feature and the pulses so produced are counted in counter 49 the total number representing the total horizontally projected length of the detected feature content. A single pulse is obtained from each intersect pulse by differentiating circuit 46 and the trailing edge pulses are eliminated by rectifying circuit 48.

Signals indicating the total vertically and horizontally projected lengths of detected feature content in a field are obtained in the accumulator 45 of FIG. 3 and the counter 49 of FIG. 5, at the end of scanning the field. If both circuits of FIGS. 3 and 5 have been operating simultaneously the two projected length signals are available at the same point in the time thereby enabling a value to be determined of the ratio of total vertically projected lengths. This is conveniently done by employing a circuit such as described with reference to FIG. 7 (to be described later).

When employed as computer module C in FIG. 2 the counter is reset to zero at the end of each modified detected video signal pulse and the counter 49 output provides the signal for module A and is accordingly denoted by II.

Figure 6:
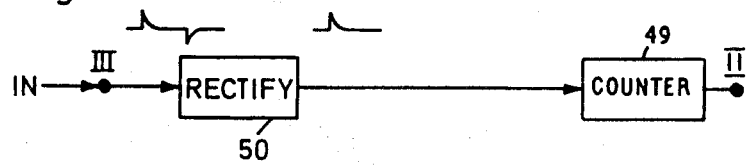
FIG. 6 is a modification of the circuit of FIG. 5 which may be applied to the circuit of FIG. 2.

Alternatively if as shown in FIG. 6 the input signals for computer module C are derived from a rectifying stage 50 connected to terminal III of FIG. 2 and arranged to eliminate the trailing edge pulses, the rectifying stage 50 and counter 49 constitute the computer module C and the connection between junction 10 and junction I is not required.

Where the vertically and horizontally projected length signals for each feature are required simultaneously, two separate associated parameter computer circuits are required. The controlling pulses from the rectifier 34 and likewise the gating pulses passed through the gate 22 are supplied to the pairs of gates 30, 36 and 37 respectively. In the one associated parameter computer, the computer module C comprises the circuit arrangement illustrated in FIG. 3 and in the other, the circuit arrangement illustrated in FIG. 5 or 6. As the feature is scanned a vertically projected length signal is accumulated in the first computer and a horizontally projected length signal is accumulated in the second computer.

Figure 7:
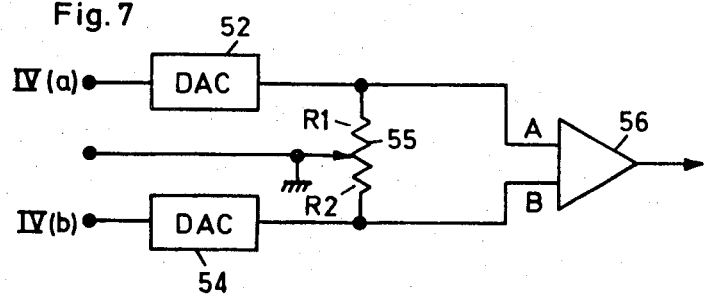
FIG. 7 is a block circuit diagram of a circuit for deriving shape factor information from signals corresponding to the horizontal and vertical projected lengths of features.

FIG. 7 illustrates a circuit for obtaining a ratio of the horizontally and vertically projected lengths of a feature. It is assumed that the two length signals are in digital form and digital analogue converter units 52 and 54 are therefore provided. The outputs from the two converter units 52, 54 are supplied to opposite ends of a common potentiometer 55 whose tapping is connected to the common terminal of the two associated parameter computer outputs and defines two different resistances R1 and R2. The two output signals developed across R1 and R2 constitute the two inputs for a comparator 56. The setting of potentiometer 55 is chosen so that for all values of the ratio of horizontally to vertically projected length below a selected value, the signal at A exceeds the signal at B and for all ratios exceeding the critical ratio the signal at B exceeds that at A. The output from the comparator 56 may for example be arranged to gate a count pulse derived for the feature concerned into one or other of two accumulators one denoting features having a projected length ratio less than the selected value and the other features having projected length ratio greater than the selected value. Information relating to the shape of features in a field may be obtained by subjecting the detected video signal pulses to size discrimination before they are applied to the circuit of FIG. 3. In effect this allows sizing of features in one direction and measurement of the features in a perpendicular direction. The output from the circuit of FIG. 3 (when the size discrimination has been applied to the input) may be combined with the signal representing the horizontally projected length of the feature in the same manner as described with reference to FIG. 7.

As more particularly described below, in FIG. 8 the circuits 58, 60 detect and count coincident leading and coincident trailing edges of features respectively, 62 is basically the same as the circuit of FIG. 3 and produces a digitized signal for vertically projected length and 64 is the inverse of FIG. 3 and produces a similar signal which is accumulated for the lengths of detected pulses which have no coincident counterpart on the next line scan. Circuits 66 and 68 add 0.3 to the total count, for each occasion when the leading or trailing edges respectively of two coincident detected pulses (one having been delayed by one line scan period) occur within the interval determined by one gating signal period.

Figure 8:
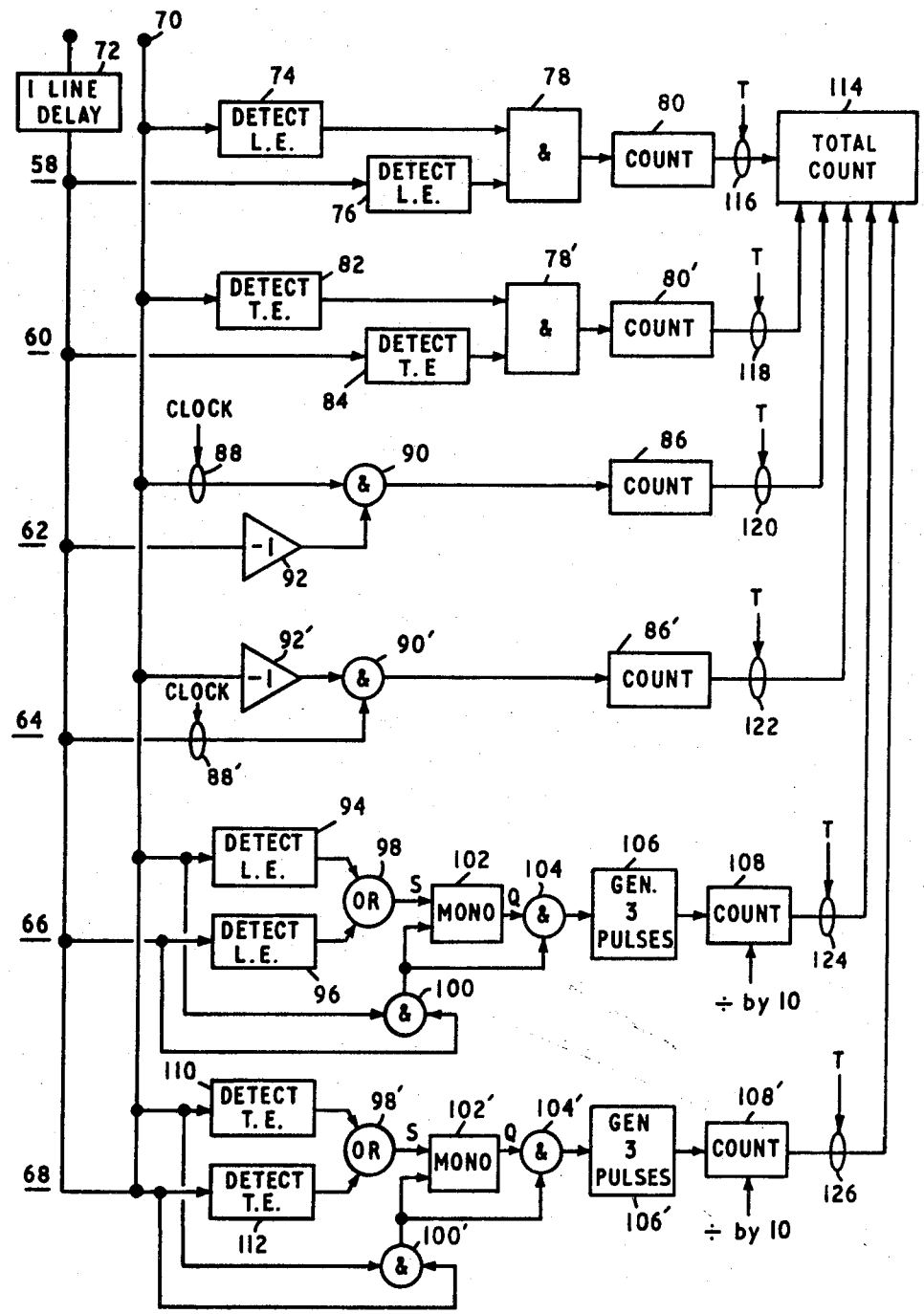
FIG. 8 is a block circuit diagram of a circuit for generating a signal whose value is equivalent to the perimeter of detected features.

In the circuit of FIG. 8 detected video signal pulses are applied to junction 70 and a delay device such as a shift register 72 delays the pulses by one line scan period. The leading edge of each detected pulse is detected by a detector 74, and a second leading edge detector 76 detects the leading edge of each delayed pulse. In the event that a leading edge is simultaneously detected by the two detectors 74, 76, the two input conditions for an AND-gate 78 are satisfied and a single pulse is produced in its output for counting by a counter 80.

Circuit 60 is similar to 58 but the leading edge detectors 74 and 76 are replaced by trailing edge detectors 82 and 84 respectively. The remaining similar components have been denoted by the same reference numerals with a suffix.

At the end of scanning a feature, the sum of the two count values in counters 80 and 80' will represent the length measured in a direction perpendicular to the direction of line scanning of all perimeter portions which are also perpendicular or nearly perpendicular to the direction of line scanning.

An approximate value can be obtained for this measurement without the necessity for circuit 60 by arranging that counter 80 of circuit 58 counts two for each pulse supplied to it from AND-gate 78.

A measure of the length of perimeter portions at the top of the feature which are parallel to or substantially parallel to the line scan direction, is obtained in counter 86. The detected signal pulses are gated by gate 88 operated by high frequency gating pulses (usually termed clock pulses) and the gated pulses form one input to an AND-gate 90. Delayed pulses from delay 72 are inverted by an amplifier 92 and form the other input to AND-gate 90. The gated pulses which appear in the output of AND-gate 90 serve as count pulses and are counted by counter 86. The action of the AND-gate 90 is to inhibit such count pulses except when a detected signal pulse on one line scan has no coincident detected signal pulse on the preceding line scan. As will be seen by comparison, the circuit 62 is essentially the same as the circuit of FIG. 3.

Circuit 64 operates in reverse to circuit 62 so as to provide in counter 86' a count value at the end of a field scan equivalent to the total duration of detected signal pulses or parts thereof which have no coicident detected signal pulse on the next line scan. Since the circuit elements are similar to those of circuit 62, the same reference numerals have been employed but with a suffix.

Like circuit 60, circuit 64 can be omitted if counter 86 counts two for every count pulse supplied to it but the perimeter signal will not be so accurate.

Thus an approximate value for feature perimeter can be obtained using only circuits 58 and 62 by combining the count values in counters 80 and 86 in an adding stage (not shown). If a more accurate value of the perimeter is required the circuits 60 and 64 are included and the count values from all four counters 80, 80' 86 and 86' are combined to form the perimeter value.

A further improvement in the accuracy of the perimeter value can be obtained by adding an incremental count value for each occasion that the difference between the leading edge co-ordinates on adjacent lines is less than the distance moved by the scanning spot in the line scan direction between gating or clock pulses. The leading edge detectors 74 and 76 together with the delay device 72 provide all the signals that are necessary to determine each such occasion and in practice the additional logic circuits would derive their signals from the outputs of these circuit elements. However for simplicity an additional circuit has been shown in full.

The outputs from the two leading-edge detectors 94 and 96 (=74 and 76) are supplied to an OR-gate 98 whilst the input signals to the two detectors also constitute the two inputs of an AND-gate 100. The output from OR-gate 98 and AND-gate 100 supply set and reset override signals respectively a monostable device 102 having a normal reset period just less than one clock pulse interval. The set output Q provides one input to a further AND-gate 104, the second input for which comprises the output from AND-gate 100. If a leading edge of a feature is inclined to the line scan direction so that on one line scan the leading edge is detected earlier than on the next line scan, monostable 102 will be SET by the first occurring leading edge and if still SET when the second leading edge is detected, it will be RESET by the second leading edge since there will then be two input signals for AND-gate 100. In this event (i.e. the second leading edge occurs within the reset period for monostable 102) two inputs will also exist for AND-gate 104 and a signal will be passed to a three-pulse-generator 106. Thus every time a signal is supplied to it from AND-gate 104 (irrespective of its duration) three count pulses pass to counter 108. The latter includes divide-by-10 function so the read out value is one tenth the number of pulses counted.

A similar arrangement is provided for adding 0.3 for each similar occasion on an inclined trailing edge and as before the signals for detecting each such occasion on the trailing edge are available from the two trailing edge detectors 82, 84 and delay device 72. However for simplicity a separate circuit 68 has been shown comprising two trailing edge detectors 110, 112, whose outputs provide the inputs for an OR-gate 98' and an AND-gate 100' the inputs for which are derived from the inputs to the two detectors 110, 112. An output from OR-gate 98' constitutes a SET signal, and the output from AND-gate 100' the RESET signal for monostable 102'. The SET output Q provides one input to an AND-gate 104' whose other input is derived from the output of the AND-gate 100'. An output from AND-gate 104' causes three pulses to be generated by generator 106' for counting by counter 108'. The latter includes a divide by 10 function so that the read out value is one tenth the number of pulses actually counted.

It will be seen that the circuit elements 98', 100', 102', 104' 106' and 108' are identical to the correspondingly numbered elements in circuit 68 and since a leading edge and trailing edge cannot coincide one set of these circuit elements can probably be dispensed with in practice.

A perimeter circuit is obtained by adding all the read out values from the counters 80, 80', 86, 86', 108 and 108'. This is effected in an overall accumulator 114 supplied with the read-out count values from the counters 80, 80', 86, 86', 108 and 108' via gates 116, 118, 120, 122, 124 and 126 respectively. The latter are normally closed and are opened by a transmit signal T, e.g. at the end of a field scan.

When an associated parameter computer as described in British Patent Specification No. 1,264,805 is employed, this accumulation is effected at the end of each modified video signal pulse for each line scan intersection with a feature, the total value being transmitted as a digital information signal which is added to any previous digital signal stored in the computer for the feature, and the updated digital signal stored in its place. In this way a separate digital perimeter signal can be built up for each feature in a field, and this signal is available for transmission as the associated parameter for the feature at its anti-coincidence point.

We claim:

1. A method of analysing features in a field comprising the steps of electronically scanning the field or an image thereof and thereby generating a video signal, comparing the amplitude excursions of the video signal with a reference voltage and generating a detected signal pulse whenever the comparison criterion is satisfied, delaying the detected signal pulses by one line scan period, gating the pulses occurring during the next line scan by the inverse of the delayed detected pulses and thereby generating a difference pulse of duration equal to that of any detected pulse or part thereof from the said next line scan which is not coincident with a delayed pulse and accumulating the difference pulses which occur during the scan of the field to form an output signal.

2. A method as set forth in claim 1 comprising the further step of electronically gating the detected signal pulses whereby each is replaced by a train of pulses the number of which is proportional to the duration of the original pulse.

3. A method as set forth in claim 1 comprising the further step of electronically gating the said difference pulses to thereby replace each by a train of pulses the number of which is proportional to the duration of the original difference pulse.

4. A method as set forth in claim 1 further comprising the steps of generating single count pulse from each detected signal pulse and accumulating the count pulses during a field scan to form a second output signal.

5. A method as set forth in claim 2 further comprising the steps of generating a single count pulse from each detected signal pulse and accumulating the count pulses during a field scan to form a second output signal.

6. A method as claimed in claim 4 further comprising the step of dividing one output signal by the other.

7. A method as set forth in claim 1 further comprising the steps of detecting whenever there is coincidence of the leading edge of a detected signal pulse and the leading edge of a coincident detected pulse delayed from the previous line scan by one line scan period and generating a count pulse whenever there is coincidence, detecting whenever there is coincidence of the trailing edges of coincident detected signal pulses from the current line scan and from the previous line scan delayed by one line scan period and generating a count pulse whenever there is coincidence, gating the delayed pulses by the inverse of those occurring during the next line scan and thereby generating a difference pulse of duration equal to the duration of any delayed pulse or part thereof which is not coincident with a detected pulse on the said next line scan thereby to generate a second series of difference pulses and accumulating the first and second series of difference pulses and said count pulses during a field scan to produce a third output signal.

8. A method as set forth in claim 7 comprising the further step of electronically gating the detected signal pulses whereby each is replaced by a train of pulses the number of which is proportional to the duration of the original pulse.

9. A method as set forth in claim 8 comprising the further steps of measuring any time difference between the appearance of the leading edge of a detected pulse and that of a coincident delayed detected pulse (delayed by one line scan period from the previous line scan) measuring any time difference between the appearance of the trailing edges of the two pulses, generating an incremental count pulse whenever the time difference is less than the gating signal period and accumulating the incremental count pulses with the said difference pulses and count pulses to form the third output signal.

10. A method as set forth in claim 9 wherein the incremental count pulses are accumulated in a subsidiary counter during each field scan and only the whole number content of the final count value in the counter is taken into account in computing the third output signal.

11. A method as set forth in claim 10 wherein the value of each incremental count pulse is 0.3.

12. A method as set forth in claim 1 comprising the further step of size discriminating the detected signal pulses before the step of comparing them with those delayed from the previous line scan.

13. A method as set forth in claim 1 comprising the further steps of associating the difference pulses arising from scanning each feature and accumulating separately the difference pulses associated with each feature, recirculating the separate accumulating signals from line to line in a memory device, comparing the detected signal pulses from each line scan with those from the previous line scan and generating an end-of-scanning pulse for each detected feature some time after the last detected pulse has been received for each feature, addressing the memory with each end-of-scanning pulse and releasing therefrom the accumulated difference pulses relating to that feature.

14. A method as set forth in claim 13 comprising the further step of size discriminating the detected signal pulses before the step of comparing them with those delayed from the previous line scan.

15. A method as set forth in claim 13 comprising the further steps of generating a count pulse for each detected signal pulse, associating the count pulses from the detected signal pulses arising from scanning each feature and accumulating separately the count pulses associated with each feature, recirculating the separate accumulating signals from line to line in a second memory device and addressing the second memory device at the same time as the first is addressed for each feature and releasing therefrom the accumulated count pulses relating to that feature.

16. A method as set forth in claim 10 further comprising the steps of accumulating any pulses arising from each detected signal pulse to form an incremental accumulation signal, associating the incremental accumulation signals arising from scanning each feature and accumulating separately the incremental accumulation signals associated with each feature, recirculating the separate accumulating signals from line to line in a memory device, comparing the detected signal pulses from each line scan and generating an end-of-scanning pulse for each detected feature some time after the last detected pulse has been received for each feature, addressing the memory with each end-of-scanning pulse and releasing therefrom the accumulation of incremental accumulation signals relating to that feature.

17. Circuit arrangement for analysing features in a field comprising means for scanning the field or an image thereof and generating thereby a video signal, of the field, voltage comparison means for comparing the video signal amplitude excursion with a reference voltage and generating a detected pulse whenever the comparison criterion is satisfied, delay means for delaying the detected pulses by one line scan period, gating means adapted to gate the detected pulses with the inverse of the pulses from the delay means thereby to remove detected pulses and portions thereof which are coincident with delayed detected pulses and means for accumulating the pulses and portions thereof which are passed by the gating means.

18. Circuit arrangement as set forth in claim 17 further comprising gating means for electronically chopping the gated detected pulses and pulse portions to form pulse trains, the number of pulses in each train being proportional to the duration of the original pulse or pulse portion.

19. Circuit arrangement as set forth in claim 18 wherein the accumulating means comprises a pulse counter.

20. Circuit arrangement as set forth in claim 19 further comprising means for deriving a count pulse for each detected pulse and a second pulse counter for counting said count pulses to thereby generate a digital signal proportional to the horizontally projected length of the detected feature content.

21. Circuit arrangement as set forth in claim 17 further comprising means for detecting coincidence of the leading edge of a detected signal pulse and that of a delayed detected signal pulse, a first counter for counting each detected coincidence, a second coincidence detector for detecting coincidence of the trailing edge of a detected signal pulse and that of a delayed detected signal pulse, a second counter for counting each detected coincidence, second gating means adapted to gate the delayed detected signal pulses by the inverse of the detected signal pulses occurring on the next line scan and thereby removing delayed detected pulses and portions thereof which are coincident with detected pulses on the next line scan, second means for accumulating the pulses and portions thereof which are passed by the second gating means, and an overall accumulator for accumulating the signals from said first and second accumulating means and said first and second counters, to form a fourth output signal.

22. Circuit arrangement as set forth in claim 21 further comprising means for measuring any time difference between the detection of a leading edge of a detected pulse and that of a coincident delayed detected pulse, second time measuring means for measuring any time difference between the detection of trailing edges of the two coincident pulses, means for generating an incremental count pulse whenever the difference is less than the gating signal period, and means for combining said incremental count pulses so produced with the other count pulses in said overall accumulator.

23. Circuit arrangement as set forth in claim 22 further comprising means for electronically chopping the detected signal pulses or delayed detected pulses, the number of pulses replacing each detected or delayed detected pulse being proportional to the duration of the original pulse.

24. Circuit arrangement as set forth in claim 23 wherein the said first and second and overall accumulators are pulse counters.

* * * * *